United States Patent
Pizlo et al.

(10) Patent No.: US 9,110,791 B2
(45) Date of Patent: Aug. 18, 2015

(54) OPTIMISTIC OBJECT RELOCATION

(75) Inventors: Filip Pizlo, West Lafayette, IN (US);
Erez Petrank, Redmond, WA (US);
Bjarne Steensgaard, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 531 days.

(21) Appl. No.: 12/041,354

(22) Filed: Mar. 3, 2008

(65) Prior Publication Data

US 2009/0222494 A1    Sep. 3, 2009

(51) Int. Cl.
*G06F 7/00* (2006.01)
*G06F 17/30* (2006.01)
*G06F 12/02* (2006.01)
*G06F 12/08* (2006.01)

(52) U.S. Cl.
CPC ........ *G06F 12/0269* (2013.01); *G06F 12/0207* (2013.01); *G06F 12/0215* (2013.01); *G06F 12/0223* (2013.01); *G06F 12/0284* (2013.01); *G06F 12/0802* (2013.01)

(58) Field of Classification Search
CPC ................................................... G06F 12/0207
See application file for complete search history.

(56) References Cited

U.S. PATENT DOCUMENTS

| | | | |
|---|---|---|---|
| 5,088,036 A | 2/1992 | Ellis et al. | |
| 5,812,702 A | 9/1998 | Kundu | |
| 5,873,105 A | 2/1999 | Tremblay et al. | |
| 6,424,977 B1 | 7/2002 | Garthwaite | |
| 6,427,154 B1 | 7/2002 | Kolodner et al. | |
| 6,430,580 B1 | 8/2002 | Azagury et al. | |
| 6,446,257 B1 | 9/2002 | Pradhan et al. | |
| 6,502,111 B1 | 12/2002 | Dussud | |
| 6,671,707 B1 | 12/2003 | Hudson et al. | |
| 6,707,952 B1 | 3/2004 | Tan et al. | |
| 6,757,442 B1 | 6/2004 | Avinash | |
| 6,766,430 B2 * | 7/2004 | Arakawa et al. | 711/165 |
| 6,804,719 B1 * | 10/2004 | Cabrera et al. | 709/226 |
| 6,920,541 B2 | 7/2005 | Kolodner et al. | |
| 6,922,757 B2 * | 7/2005 | Frank et al. | 711/147 |

(Continued)

FOREIGN PATENT DOCUMENTS

EP    1816602 A1    8/2007

OTHER PUBLICATIONS

Thomas Radke "Counting Semaphores", Sep. 20, 1996.*

(Continued)

*Primary Examiner* — Loan T Nguyen
(74) *Attorney, Agent, or Firm* — Sandy Swain; Judy Yee; Micky Minhas

(57) ABSTRACT

Object relocation often involves a multi-word copy of the object from a source address to a destination address, followed by updating the references (e.g., pointers) to the object. However, during the relocation, other threads may write to portions of the object that have already been relocated, and the updates may be lost when the references are updated to point to the destination address. A non-blocking relocation technique may be implemented to permit threads to write to the object during the relocation, wherein the memory accesses are monitored for a write to the object. If a write is detected during the relocation, the relocation fails and the memory at the destination address is deallocated; but if no write is detected, the relocation succeeds and the references are updated to point to the destination address. Refinements of this technique may be implemented to reduce other synchronization issues.

20 Claims, 7 Drawing Sheets

(56) References Cited

U.S. PATENT DOCUMENTS

| | | |
|---|---|---|
| 7,043,509 B2 | 5/2006 | Detlefs |
| 7,069,281 B2 | 6/2006 | Garthwaite |
| 7,092,978 B2 | 8/2006 | Garthwaite |
| 7,102,638 B2 | 9/2006 | Raskar et al. |
| 7,146,059 B1 | 12/2006 | Durand et al. |
| 7,155,067 B2 | 12/2006 | Jayant et al. |
| 7,174,039 B2 | 2/2007 | Koo et al. |
| 7,174,354 B2 | 2/2007 | Andreasson |
| 7,240,131 B1 * | 7/2007 | Bjornsson et al. ............ 710/33 |
| 7,337,292 B2 * | 2/2008 | Eguchi et al. ................ 711/165 |
| 7,447,860 B1 * | 11/2008 | Haase et al. ................. 711/164 |
| 7,634,491 B2 * | 12/2009 | Cabrera et al. ...................... 1/1 |
| 7,716,192 B2 * | 5/2010 | Petrank et al. ............... 707/695 |
| 2004/0153687 A1 * | 8/2004 | Moir et al. ........................ 714/1 |
| 2005/0021576 A1 | 1/2005 | Barabash et al. |
| 2005/0081010 A1 * | 4/2005 | DeWitt et al. ................ 711/165 |
| 2005/0138092 A1 | 6/2005 | Abuaiadh et al. |
| 2005/0149587 A1 | 7/2005 | Bacon et al. |
| 2005/0149589 A1 | 7/2005 | Bacon et al. |
| 2005/0149937 A1 * | 7/2005 | Pilkington ................... 718/102 |
| 2005/0198088 A1 * | 9/2005 | Subramoney et al. ........ 707/206 |
| 2005/0223018 A1 * | 10/2005 | Forin et al. ................... 707/100 |
| 2006/0085433 A1 | 4/2006 | Bacon et al. |
| 2006/0155791 A1 | 7/2006 | Tene et al. |
| 2007/0036456 A1 | 2/2007 | Hooper |
| 2007/0162528 A1 * | 7/2007 | Wright et al. ................. 707/206 |
| 2007/0165962 A1 | 7/2007 | Smirnov et al. |
| 2007/0174370 A1 | 7/2007 | Detlefs et al. |
| 2007/0223834 A1 | 9/2007 | Lertrattanapanich et al. |
| 2009/0024818 A1 * | 1/2009 | Yamada et al. ............... 711/170 |
| 2010/0191783 A1 * | 7/2010 | Mason et al. ................. 707/822 |

OTHER PUBLICATIONS

Dave Marshall "IPC:Semaphores", Jan. 5, 1999.*
Schoeberl, et al., Garbage Collection for Safety Critical Java, Copyright 2007 ACM, Vienna, Austria, Sep. 26-28, 2007, pp. 1-9.
Bacon, et al., A Real-time Garbage Collector with Low Overhead and Consistent Utilization, IBM T.J. Watson Research Center, Yorktown Heights, NY, 03, Jan. 15-17, pp. 285-295.
Vandeginste, et al., Incremental copying garbage collection for WAM-based Prolog systems, Department of Computer Science, K.U.Leuven, Belgium, 07, Aug. 24, vol. 7, pp. 1-2.
HP, Release Notes, Software Development Kit (SDK) v 1.4.2-3 for the OpenVMS Integrity (I64) Operating System for the Java™ Platform, 07,Nov. 8, pp. 1-7.
U.S. Appl. No. 12/038,816, filed Feb. 28, 2008, Bennett et al.
U.S. Appl. No. 12/041,380, filed Mar. 3, 2008, Pizlo et al.
Bennett et al. "Fine Feature Preservation in HDR Tone Mapping", The University of North Carolina at Chapel Hill, Department of Computer Science, p. 1.
Huelsbergen et al. "Very Concurrent Mark & Sweep Garbage Collection Without Fine-Grain Synchronization", Bell Labs, Lucent Technologies, Murray Hill, NJ, USA, Copyright 1998 ACM., pp. 166-175.
Paz et al. "Efficient On-the-Fly Cycle Collection". pp. 1-16.
Polesel et al. "Image Enhancement via Adaptive Unsharp Masking", pp. 1-16.
Printezis et al. "A Generational Mostly-Concurrent Garbage Collector", Jun. 2000, pp. 1-33.
Wu et al. "Feature Matching and Deformation for Texture Synthesis", ACM SIGGRAPH 2004 conference proceedings, University of Illinois, Urbana-Champaign, pp. 1-4.

* cited by examiner

OPTIMISTIC OBJECT RELOCATION

BACKGROUND

Many scenarios in computer systems involve relocating a block of data, such as the representation of an object, from one area of memory to another. The relocation is generally performed by performing a per-word copy of the data from a source memory address to a destination memory address. The relocation also involves updating references to the data, such as memory pointers, from the source memory address to the destination memory address. Once the references are updated, the block of memory at the source address may be deallocated for reuse.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The relocation of an object in memory through a per-word copy is often not an instantaneous or atomic process. Even in the context of an object embodied in a single memory word, such as an integer, the elements of the relocation process may cause synchronization issues. For example, an integer used in an application thread may be relocated by a memory management thread, such as during a memory compaction. The memory manager may read the integer from the source address, write the integer to the destination address, and then update the reference in the application thread to point to the new location. However, in many scenarios, such as multiple threads executing in an environment with preemptive task scheduling or multicore processor architectures, the application thread may execute concurrently with the memory management thread. If the application thread writes a new value to the memory word after the memory management function reads the value to be written, but before the reference in the application thread is updated, then the new integer value will be written to the source address instead of to the destination address. The value will therefore be lost when the reference is updated by the memory management thread. It may be possible to apply a synchronization mechanism to the memory location, such as a lock. However, such solutions entail blocking all of the threads that attempt to access the object during the relocation, and the duration of the blocking may significantly diminish the performance of the computer system. Such issues may arise more often where the amount of data to be relocated is large (e.g., for an object comprising a significant amount of data, such as a long array), and/or where the object is accessed, and in particular updated, by a large number of threads.

An alternative technique presented herein involves a non-blocking relocation mechanism, wherein threads are permitted to read, and even to write, to the source address while the object is being relocated. The technique involves monitoring the memory accesses to the source address during the relocation operation. If no write accesses are detected during the relocation, then the references to the object may be updated to the destination address, and the object may be considered successfully relocated. If a write access is detected, then the relocation operation is simply aborted, with the memory allocated at the destination address being deallocated. The thread responsible for relocating the object may subsequently try to relocate the object again, when the thread that wrote to the object during the unsuccessful relocation may have moved on to another task or set of instructions that do not involve writing to the object. In this manner, the relocation may be managed to reduce synchronization problems caused by the non-instantaneous relocation, while also reducing the blocking of threads during the object relocation.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
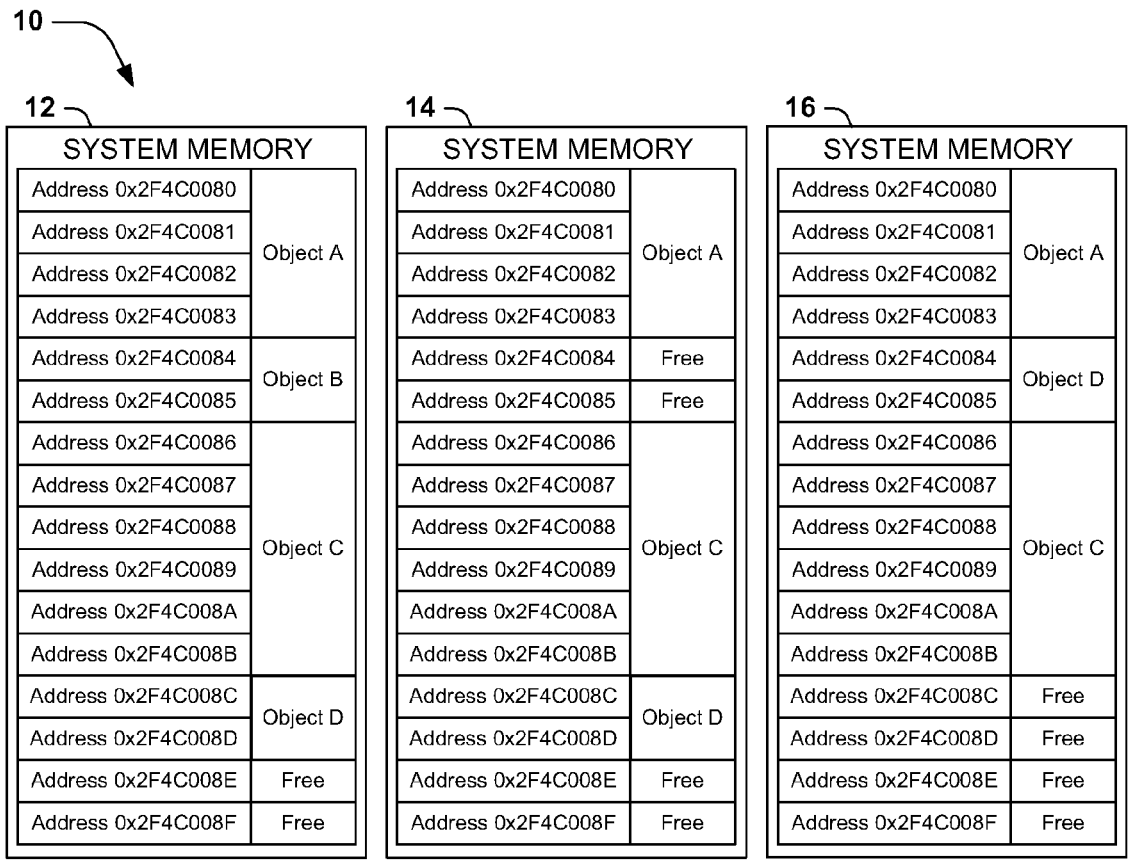
FIG. 1 is an illustration of a set of memory states presenting an exemplary scenario including an object relocation.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Objects in computer systems are stored within allocated blocks of memory, which is typically modeled as a one-dimensional array of words of various sizes (e.g., 32 or 64 bits.) Objects of various sizes may be instantiated by allocating appropriately sized blocks of memory and storing values in a structured order to represent the various fields of the object, as defined by the object class. The objects may then be referenced according to the memory address of the object, and a field within the object may be located according to the class structure.

Many scenarios in computing involve relocating an object from a current block of memory to an allocated block of memory at a different address. As one example, a memory manager, such as a garbage collector, may endeavor to compact the system memory in order to reclaim fragmented portions of memory between objects. FIG. 1 illustrates one such example 10, comprising a block of hexadecimally addressed memory, each address comprising one memory word. The first memory state 12 comprises a memory containing three objects: a four-word object A, a two-word object B, a six-word object C, and a two-word object D, with two free words of memory. The example 10 illustrates the consequences of deallocating object B, producing the second memory state 14 comprising a two-word fragment of memory between objects A and C and a two-word fragment of memory after object D. Despite the presence of four free words of memory, the second memory state 14 cannot store a three-word object without spreading the object over the various memory fragments, which may cause inefficiencies and diminished computing performance. Instead, the memory may be compacted by relocating object D to the fragment between objects A and C in order to consolidate the free memory. The resulting third memory state 16 comprises the objects A, C, and D, and also comprises a four-word block of free memory that could be used to store, e.g., a three-word object. Other scenarios that may involve the relocation of objects include dynamically sized objects (e.g., if object A in the example 10 of FIG. 1 changed size to include three additional words), object pooling (e.g., where an object used in the memory space of a first thread is donated to a second thread, and is to be relocated to the memory space of the second thread), and security applications (e.g., where the memory address of a protected object is to be kept secret, and the object may be relocated if the memory address might be detected.)

When an object is to be relocated from a source address to a destination address, the object may be sequentially copied, in blocks of one or more words, from the source memory to the destination memory. The references to the object may also be updated to reference the object at the destination address rather than the memory address. Some various techniques for updating the references may be available; as one example, the computer system may maintain a list of references to the object in various threads, and may refer to the list to locate the references to be updated due to the object relocation. After the copying is complete, the block of memory at the source address may be deallocated to reclaim the memory for other uses.

Figure 2:
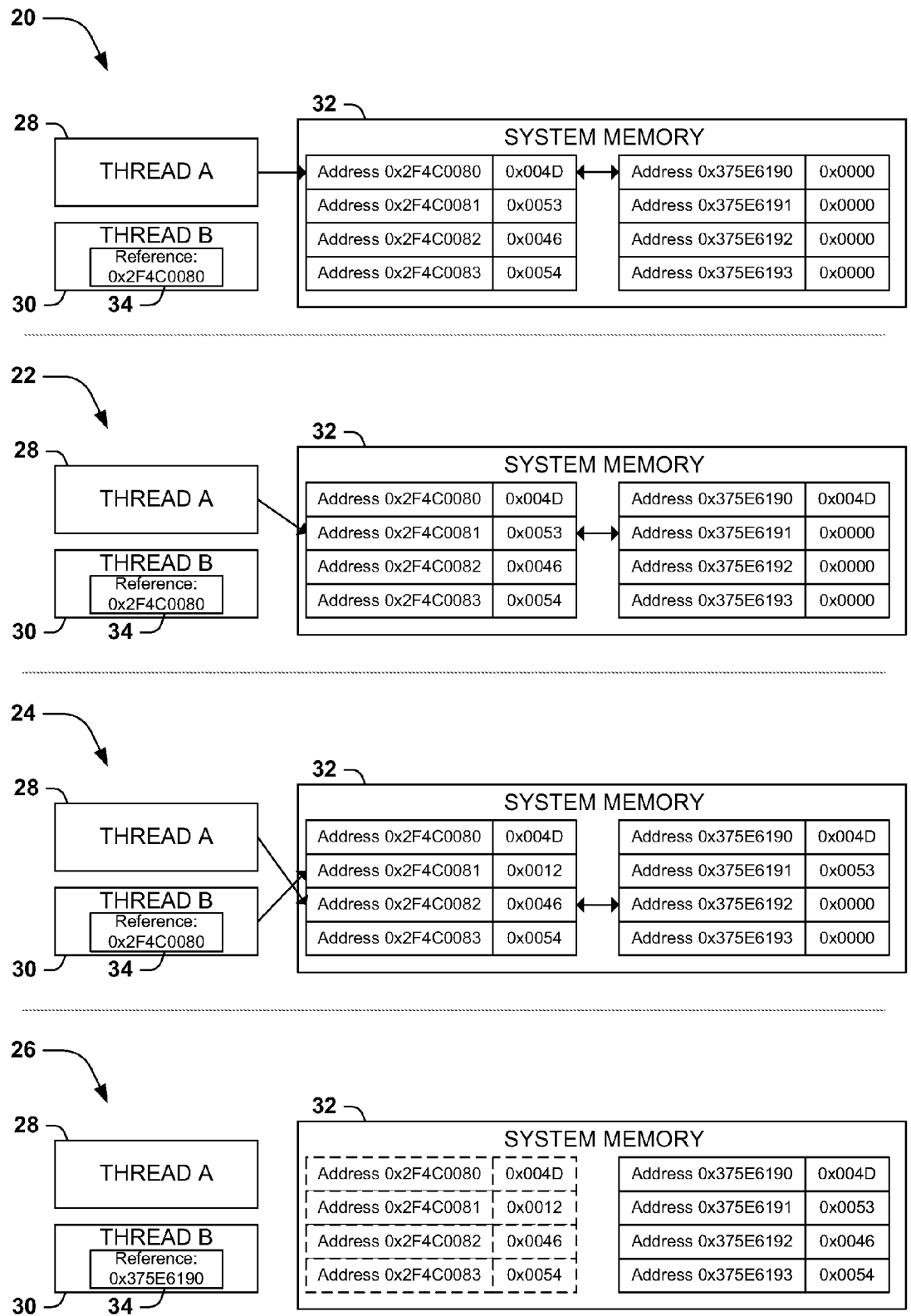
FIG. 2 is an illustration of a set of memory states presenting an exemplary object relocation operation having a lost object update.

However, a problem may arise if the object is relocated while in use. If a thread modifies the object while the object is being relocated, the value written to the object may not be copied to the destination address, and may therefore be lost. FIG. 2 illustrates an example of this scenario, represented as a set of states illustrating an interaction between two threads—thread A 28 and thread B 30—and a system memory 32. In this example, thread A 28 is relocating an object stored in the system memory 32 from a source address (0x2F4C0080) to a destination address (0x375E6190), while thread B 30 is using the object via an object reference 34 contained in the thread. (In this example and others discussed herein, the computer system is configured to store a 16-bit word at each address, e.g., 0x0000. While few contemporary computer systems utilize a 16-bit architecture, it will be appreciated that the hypothetical computer system presented in these examples is presented in this manner in the interest of simplified illustration.) In the first state 20, thread A 28 begins copying the object, starting with the first word at 0x2F4C0080. In the second state 22, thread A 28 has copied the first word at 0x2F4C0080 to the corresponding destination address, and is copying the word at 0x2F4C0081. In the third state 24, thread A 28 has copied the first two words of the object and is copying the word at 0x2F4C0082, but thread B 30 has modified the second word of the object. Because the object reference 34 within thread B 30 still indicates the location of the object at the source address, the update by thread B 30 is written to the corresponding source address at 0x2F4C0081. In the fourth state 26, thread A has finished copying the object, and the object reference 34 within thread B 30 has been updated, and the block of the system memory 32 at the source address 0x2F4C0080 is deallocated for reuse. However, the version of the object at the destination address 0x375E6190 in the system memory 32 does not contain the update written by thread B 30 to address 0x2F4C0081 during the copying. Hence, the update to the object is lost due to the synchronization issue created during the sequential word relocation technique.

An alternative technique may be devised for relocating an object in such circumstances while reducing the incidence of lost object updates. In view of the possibility that a thread may write to an object during the relocation, the computer system may monitor the activities of the threads to determine whether a write occurs. If no such write occurs, then the computer system may update the references to the object within the threads to complete the object relocation. If a write is detected, then the computer system may simply abort the relocation and allow the threads to continue using the object at the source address. The version or portion thereof of the object at the destination address may be reclaimed for other uses, and another attempt to relocate the object may be made, either promptly or after waiting a period to improve the odds that the threads may not be using the object.

Figure 3:
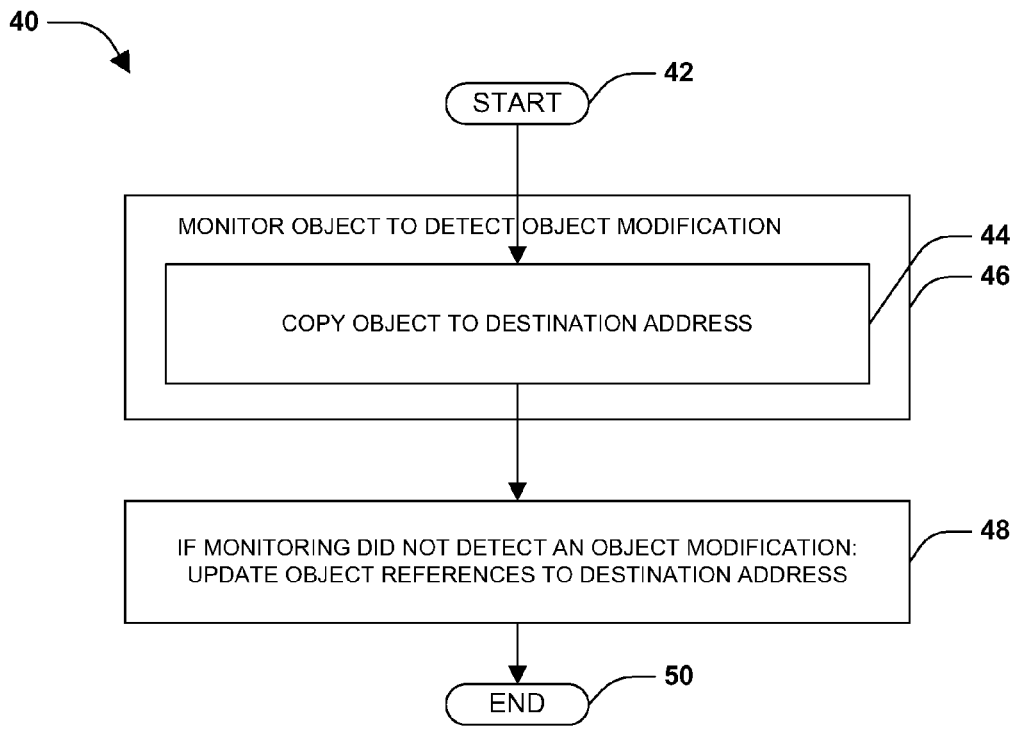
FIG. 3 is a flow diagram illustrating an exemplary method of relocating an object.

FIG. 3 presents a first embodiment, comprising an exemplary method 40 of relocating to a destination address an object located at a source address referenced by at least one reference within at least one thread. The exemplary method 40 begins at 42 and involves copying the object to the destination address 44. The exemplary method 40 also involves, during the copying 44, monitoring the object to detect an object modification by at least one thread 46. The exemplary method 40 also involves, after the copying 44, updating the at least one reference to the destination address if the monitoring did not detect an object modification during the copying 48. Having achieved the relocation of the object in the event of an absence of updates to the object during the copying 46, the exemplary method 40 therefore ends at 50. Although not shown in the exemplary method 40, provisions may also be made for handling the scenario where a write is detected; for example, the copying 46 may be aborted, and the method may optionally begin a second attempt to relocate the object by restarting at 42.

Figure 4:
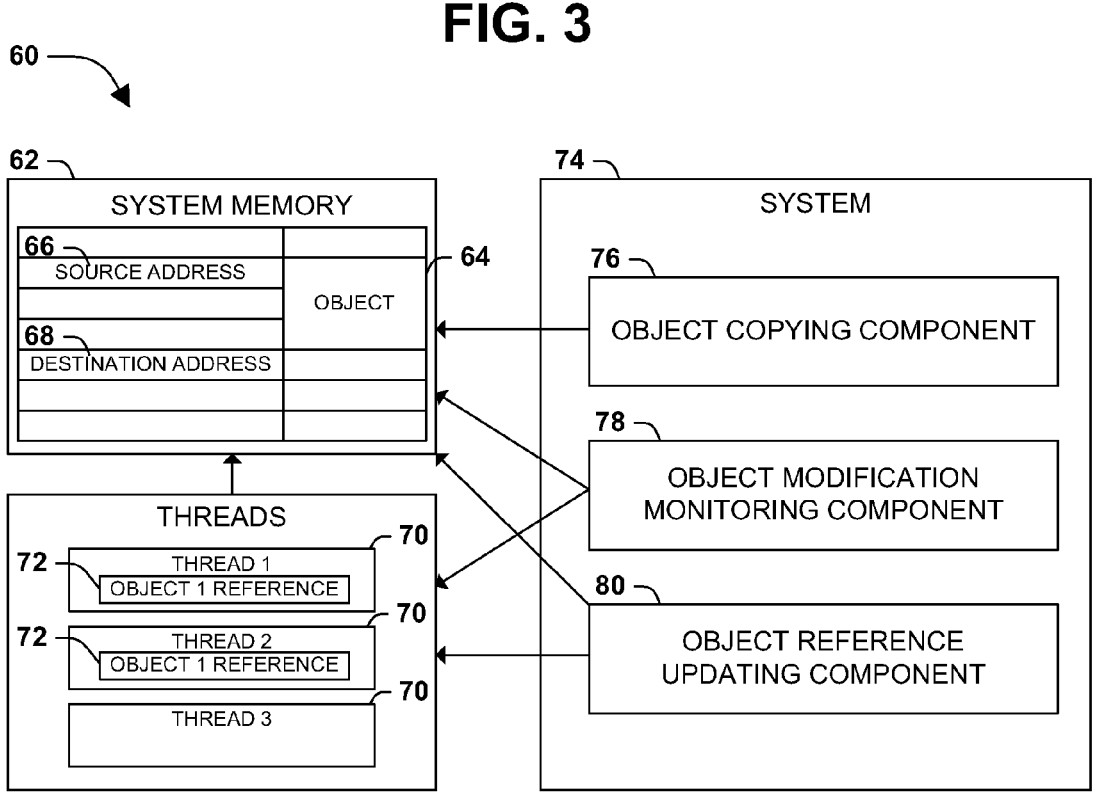
FIG. 4 is a component block diagram illustrating an exemplary system for relocating an object configured to avoid a lost object update scenario.

FIG. 4 illustrates another embodiment of these techniques, comprising an exemplary system 74 for relocating to a destination address an object 64 located at a source address and referenced by at least one reference 72 within at least one thread 70. The exemplary system 74 in this example 60 operates in the context of a computing environment comprising a system memory 62 configured to store data at various memory addresses, which may comprise one or more objects, and which is operated upon by a collection of threads 70 configured to perform various tasks. In this example 60, the system memory 62 contains an object 64 at a source address 66 that is to be relocated to a destination address 68, and the collection of threads 70 contains two threads that contain a reference 72 to the object 64 (i.e., that contain a variable storing the source address 66 at which the object 64 is presently located.) The exemplary system 74 may be applied to this example 60 to achieve the relocation of the object 64 from the source address 66 to the destination address 68 while reducing or eliminating the risk of an object modification by one or more threads 70 that may be lost during the relocation. The system 74 comprises an object copying component 76 operably coupled to the system memory 62 and configured to copy the object 64 to the destination address 68. The exemplary system 74 also comprises an object modification monitoring component 78 configured to detect a modification of the object 64 by at least one thread 70 during the copying by the object copying component 76. The exemplary system 74 also comprises an object reference updating component 80, which is configured to update the at least one reference 72 to the object 64 so that the reference 72 points to the destination address 68 in the system memory 62 after the copying by the object copying component 76 if the object modification monitoring component 78 did not detect an object modification during the copying by the object copying component 76. By utilizing the object copying component 76, the object modification monitoring component 78, and the object reference updating component 80 to copy the object to the destination address 68 and to update the references 72 if no object modification is detected during the copying, the system 74 achieves the relocation of the object 64 in a manner that reduces or eliminates the possibility of lost object modifications.

The aspects of the techniques described herein may be implemented with many variations, and some variations may present additional advantages and/or reduce disadvantages with respect to other variations of these and other techniques. A first aspect that may vary among implementations relates to the scenario in which the techniques are applied. As one example, and as shown in the example 60 of FIG. 4, the techniques may be practiced to relocate an object from one location in a memory to another location in the memory. The memory may be a system memory, or a storage device such as a hard disk drive or a flash memory device, etc. The techniques may also relocate an object from an address in a first memory to an address in a second memory (e.g., from system memory to a hard disk drive, or from a memory cache to a main system memory.) Such memories might exist on different computer systems, such as between a first computer system configured to host the object at the source address in a first memory and a second computer system configured to receive and store the object at the destination address in a second memory. These computer systems may be configured to implement the techniques discussed herein by collaborating to detect modifications of the object during the copying of the object, e.g., across a computer network through which the computer systems may communicate. As a second example, the techniques may be applied in a computing system having a single-core processor, which may perform the copying as part of a first thread (e.g., a thread comprising a memory management system process) processed in alternating concurrence with other threads that may endeavor to modify the object during the copying. The techniques may also be applied in a computing system having a multicore processor, and/or multiple processors, wherein the copying may be performed in one thread executed by a first core or processor, while other threads executed by other cores or processors endeavor to modify the object during the copying. As a third example, the relocation may be performed to achieve many ends, such as memory compaction (as illustrated in FIG. 1); memory or object defragmentation (e.g., where portions of a large object are stored in different portions of memory, and the computer system is consolidating the portions into a single data block); object pooling (e.g., reusing an object by relocating it from the heap space of a first thread to the heap space of a second thread); message passing (e.g., passing a message comprising an object from the heap space of one thread, such as an outgoing message queue of a thread sending the message, to a heap space of a second thread, such as an incoming message queue of a thread receiving the message); and security applications (e.g., where a heap space of a protected thread is stored at an undisclosed memory location to prevent interference by other threads.) Many computer system architectures and scenarios may be devised by those of ordinary skill in the art that involve relocating an object according to the techniques discussed herein.

A second aspect that may vary among implementations relates to the manner of copying the object, such as may be performed by the object copying component 76 in the exemplary system 74 of FIG. 4. As one example, the copying may be performed by a per-word copy comprising copying respective words from the source address to the destination address in sequence. Alternatively, the copying may be performed in batch, such as by various threads configured to copy portions of the object concurrently (e.g., five copying threads configured to copy every fifth memory address.) As another alternative, the copying may be performed in a pipelined or burst manner, such that when one word of the object is read, some sequentially following words of the object are prefetched into a memory cache in anticipation of a sequential read. Similarly, the writing of the words to the destination address may be buffered if the processor is capable of issuing the write instructions faster than the write capabilities of the destination memory device (e.g., where a comparatively fast processor is copying an object from a comparatively fast system memory to a comparatively slow hard disk drive device.)

As a second example of this aspect, the relocation may comprise a sequential copy of the words comprising the object, such as by copying from the first word at the source address to the first word at the destination address, then copying from the second word at the source address to the second word at the destination address, etc. This copying may be performed in a simple and comparatively fast manner, such as according to the following pseudocode:

```
for (int index = 0; index < object.size; index++)
    memory[destination_address + index] =
    memory[source_address + index];
```

A third aspect that may vary among implementations relates to the detection of object modifications during the copying, such as may be performed by the object modification monitoring component 78 in the example 60 of FIG. 4. As one example, the monitoring may comprise monitoring memory write operations of the at least one thread to detect an object modification. For instance, in the example 10 of FIG. 1, while relocating object D, the memory manager may be configured to monitor the addresses 0x2F4C008C-0x2F4C008D to detect a write to these addresses prior to completing the relocation. Alternatively, a runtime configured to handle one or more threads may be configured to detect memory write operations, and may check the written addresses against the memory locations of objects currently being copied. In either scenario, if such a write is detected, the monitoring may conclude that the object has been modified, and may abort the copying or the updating of references. As a more sophisticated embodiment of this monitoring technique, the monitoring component may be configured to monitor only the addresses comprising the portions of objects that have already been copied by the relocation thread. For instance, if a thread writes to memory address 0x2F4C008D while the copying thread is copying 0x2F4C008C in a sequential per-word copying process, then the monitoring may disregard the updating, since the updated data at memory address 0x2F4C008D will be copied into the version of the object at the destination address as a matter of course. However, this monitoring technique might reduce the performance of the computer system by checking each memory write by each thread, which may constitute a significant performance reduction if many memory writes occur during the relocation, or if many relocations are performed (e.g., by an eager memory manager that often relocates objects during spare computing cycles to maintain a compact and unfragmented memory store.)

Another example of the aspect of monitoring object modifications during copying involves associating with the object a relocation status semaphore, comprising a thread-safe, atomically updatable variable indicating the status of the object. The relocation status semaphore may be used to communicate among various threads the relocation status of an object, and the threads may respond differentially with respect to the object based on the value of the relocation status semaphore. A relocation status semaphore configured to operate in this thread-safe manner may be utilized in many forms. In one such embodiment, the relocation status semaphore may comprise associating with the object a binary semaphore, which may be set to TRUE while initializing the relocation of the object, and FALSE when the object is not being relocated. The monitoring, e.g. which may be performed by an object modification monitoring component, may therefore monitor updates to various objects based on the value of the relocation status semaphore. For instance, a memory manager may be configured to set the value of the relocation status semaphore to FALSE upon updating any object; and the system performing the relocation may be configured to set the relocation status semaphore to TRUE upon beginning an update, and to verify that the relocation status semaphore is still TRUE before updating the references to complete the relocation. This embodiment may present an advantage of omitting conditional logic from the memory manager (e.g., by not having to check whether the relocation status semaphore is TRUE or FALSE prior to updating it), thereby reducing the performance penalty of the monitoring. Alternatively, the object modification monitoring component may be configured to check the value of the binary semaphore, and to set it to FALSE only if the binary semaphore is TRUE; the conditional logic included in this embodiment may impose a computational burden, but this embodiment may also present an advantage of reducing unnecessary updates to the binary semaphore (i.e., updating the binary semaphore to FALSE when it is already FALSE.) Moreover, the performance penalty of checking the binary semaphore might be reduced by performing it in a non-locking manner, since a read of the current value of the binary semaphore may not present a synchronization issue.

A second variation of the object modification monitoring includes an object modification counting semaphore that indicates the number of threads currently modifying the object. An object modification counting semaphore may be used, e.g., to track the use of the object both by an object relocation thread and by various object modifying threads. For instance, threads that utilize (and may potentially modify) an object may be configured to increment the object modification counting semaphore before modifying the object, and to decrement the object modification counting semaphore after modifying the object. The object relocation thread may be configured to initiate the relocation by changing the object modification counting semaphore from zero to the maximum counting value for the data type comprising the counting enumeration (e.g., where the counting enumeration is a 32-bit (four-byte) signed integer, the object relocation thread may be configured to initiate an object relocation by setting the counting enumeration to MAXINT, i.e., 2,147,483,647.) The object relocation thread may also be configured to set to object modification counting semaphore to zero upon completing the relocation. This variation in the relocation status semaphore may present (at least) two advantages. First, it may be easier to initiate the modification of the relocation process for an object by waiting for its counting enumerator to reach zero, indicating that no threads are in the process of updating the object. Second, it may be easier to detect modifications to the object during the copying, because the increment operation performed by a thread may cause the counting enumeration (last set to MAXINT by the object relocation thread) to overflow, which may generate an exception that may be trapped by an object modification monitoring component.

Figure 5:
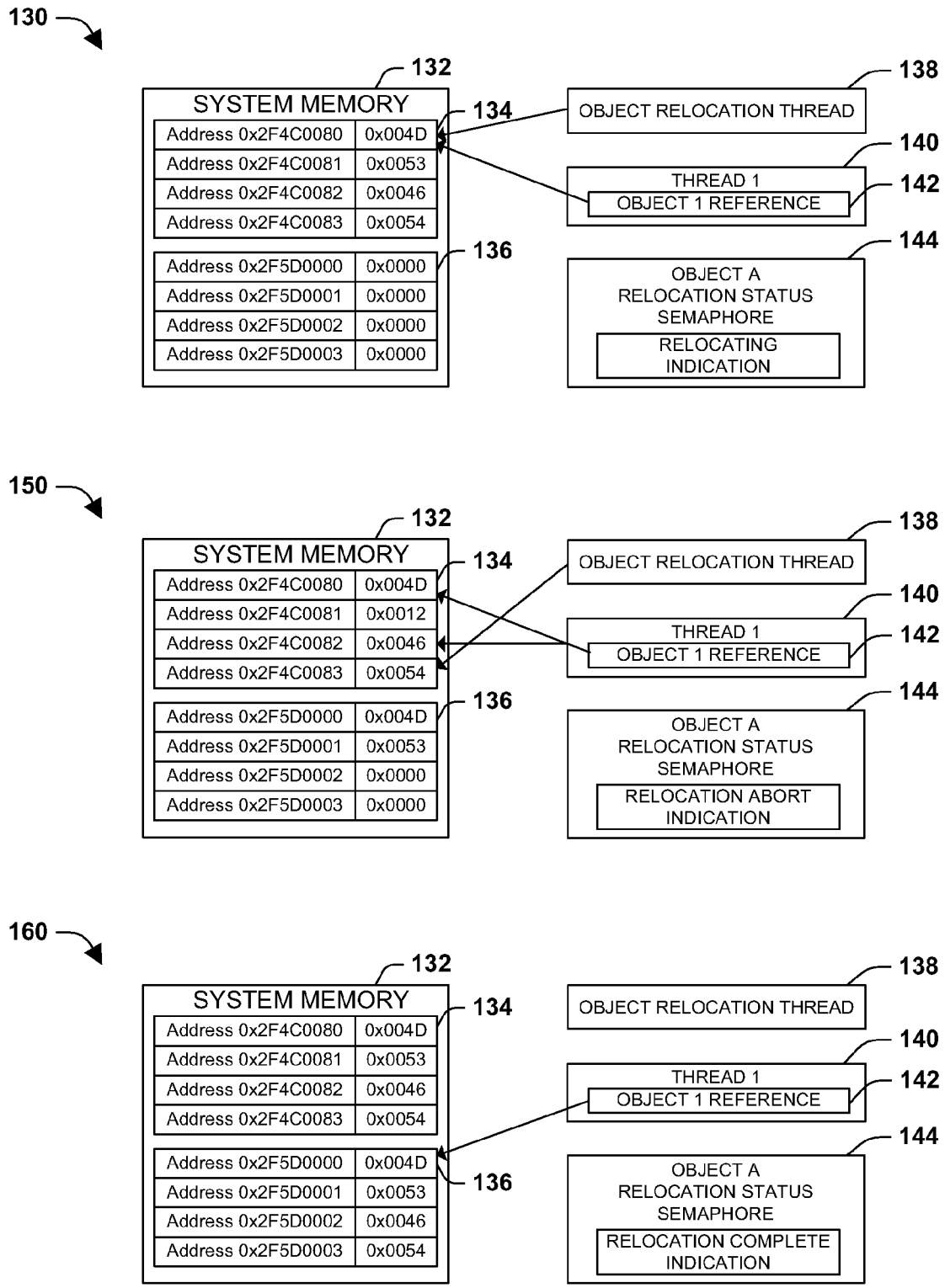
FIG. 5 is an illustration of a set of memory states presenting an exemplary object relocation operation having an object relocation status semaphore.

A third variation of the relocation status semaphore involves an enumerating semaphore, which may be set to various values to indicate the relocation status of the associated object. For instance, the enumerating semaphore may comprise an inactive indicator, indicating that the object is not being relocated; a relocating indicator, indicating that the object is being relocated; a relocation abort indicator, indicating that the object is being relocated but has been modified during the copying; and a relocation complete indicator, indicating that the object has been safely relocated. The enumeration may be achieved, e.g., by storing a single value, such as an integer having predefined values representing various enumerated indications, or as two or more Boolean values that together indicate various enumerated indications. FIG. 5 presents a first memory state 130, a second memory state 150, and a third memory state 160 that together illustrate an exemplary use of an enumerating semaphore configured in this manner. These examples involve a system memory 132 containing a four-word object (identified as "Object A") at a source address 134 (beginning at address 0x2F4C0080) to be relocated to a four-word destination address 136 (beginning at address 0x2F5D0000.) The relocation of Object A is to be relocated by a relocation thread 138, such as a memory management thread, and which may be configured (e.g.) to perform the exemplary method 40 of FIG. 3, and/or to implement the exemplary system 74 of FIG. 4. Object A is also in use by an object modifying thread 140 ("Thread 1") that contains a reference 142 to Object A, and that may attempt to modify the object during the relocation of Object A by the relocation thread 138. The embodiment of the technique illustrated in FIG. 5 performs the relocation with reference to an enumerating relocation status semaphore 144 associated with Object A ("Object A Relocation Status Semaphore".)

In the example illustrated in FIG. 5, when Object A not targeted for relocation, the relocation status semaphore 144 may comprise an inactive indication. As illustrated in the first memory state 130, when Object A is targeted for relocation, the computer system may initialize the relocation by setting the relocation status semaphore 144 to a relocating indication.

The relocation thread 138 may then proceed with copying the object from the source address 134 to the destination address 136, e.g., through a sequential per-word copy. As illustrated in the second memory state 150, the monitoring of Object A for modification during copying by the relocation thread 138 may be configured to set the relocation status semaphore 144 for the object to a relocating abort indication upon detecting an object modification, e.g., by the object modifying thread 140. Upon completing the copying and before updating the references to the object (such as the reference 142 within the object modifying thread 140), the computer system may verify that the relocation status semaphore 144 still comprises a relocating indication. If the relocation status semaphore 144 has been updated to indicate a relocation abort indication (such as in the second memory state 150), the relocation thread 138 may abort the relocation, including declining to update the references; and the relocation thread 138 might be additionally configured to attempt a second relocation promptly or at a later time. However, if the object modifying thread 140 does not modify the object during copying, the relocation thread 138 may successfully verify after copying the object that the relocation status semaphore 144 for the object comprises a relocating indication upon completing the copying. As illustrated in the third memory state 160, the relocation thread 138 may therefore set the relocation status semaphore 144 for the object to a relocation complete indication, and the references to the object (including the reference 142 within the object modifying thread 140) may be updated to reflect the successful relocation of the object. While using an enumerating semaphore or a counting semaphore for the relocation status semaphore may be more complicated than using a binary semaphore, the additional information represented thereby might be advantageously utilized by other aspects of the object relocating system.

Figure 6:
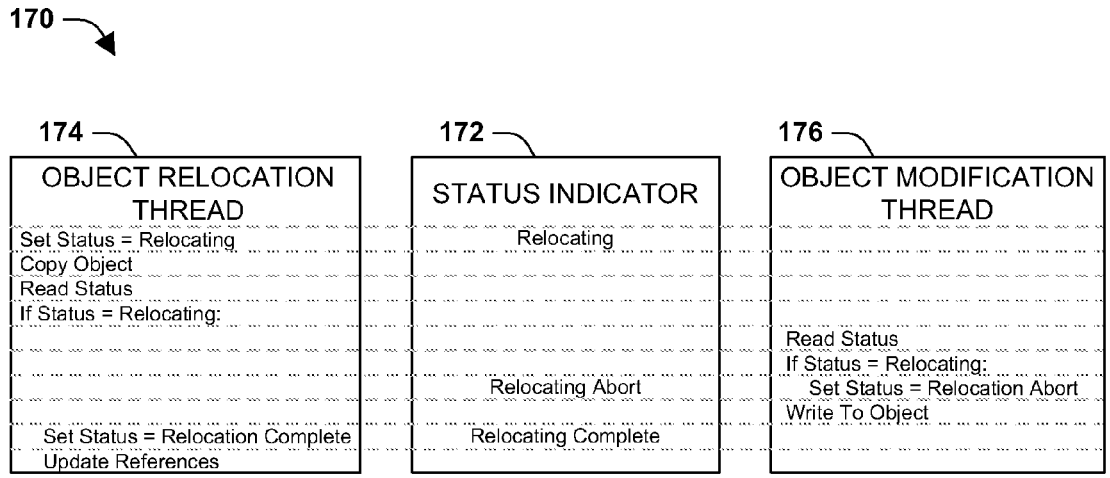
FIG. 6 is an illustration of an object relocation thread and an object modification thread interacting through a relocation status indicator without a synchronization mechanism.

The examples presented in this aspect utilize a semaphore of various forms for communicating a status indicator for the object among the object relocation thread and the object modification threads. A semaphore may be advantageously chosen over an object type having a weaker synchronization or lacking a synchronization mechanism, because the latter selection may be vulnerable to a race-condition scenario that results in a lost update to the object. FIG. 6 illustrates an exemplary scenario 170 where the use of a non-thread-safe status indicator may result in a lost update. The exemplary scenario 170 involves a status indicator 172 that may be freely read and written by any thread without a synchronization mechanism, and that is used to coordinate the relocation of an object relocated by an object relocation thread 174 and referenced by an object modification thread 176. The object relocation thread 174 and the object modification thread 176 comprise various instructions (illustrated herein as pseudocode) for performing the respective functions in accordance with the techniques presented herein. Moreover, the instructions are spaced to illustrate an interleaving of performed instructions, such that a first portion of the object relocation thread 174 runs, then the object modification thread 176 runs, then a second portion of the object relocation thread 174 runs. The status indicator 172 illustrates the stored relocation status for the object in response to various operations of the threads. This order of processing might be effected in a computing environment comprising a preemptive task scheduler configured to interleave the processing of various threads, or in a multicore and/or multiprocessor computing environment, which may be capable of concurrently running the object relocation thread 174 and the object modification thread 176.

The scenario illustrated in FIG. 6 involves a scheduling of the read and write operations of the object relocation thread 174 in such a manner that causes a loss of an update of the status indicator 172 by another thread, such as the object modification thread 176. After copying the object to the destination address, the object relocation thread 174 checks the status indicator 172 to determine whether the object was modified during the copying. Finding the status indicator 172 to indicate no intervening object modification, the object relocation thread 174 prepares to update the status indicator 172 to indicate a completed object relocation. However, before the object relocation thread 174 can update the status indicator 172, the object modification thread 176 reads the same status indicator and determines that the object is being relocated. The object relocation thread 174 then sets the status indicator 172 to a relocation abort indication to signal the modification of the object during the copying and writes to the version of the object at the source address. However, this signal is not propagated to the object relocation thread 174, which has already performed the checking of the status indicator 172. Instead, the object relocation thread 174 resumes processing by updating the status indicator 172, thereby overwriting the relocation abort indication with a relocation complete indication. The object relocation thread 174 then updates the references, causing the update to the version of the object at the source address to be lost, as the references now reference the version of the object at the destination address that does not contain the update.

This scenario for data loss may be reduced or eliminated by utilizing a semaphore for the status indicator 172. The semaphore makes use of a compare-and-swap operation, which comprises a specialized operation for performing a comparison and a memory write as an atomic operation. The compare-and-swap operation is of the form:

```
if (memory == expected value)
    set memory to new specified value;
and may thus be represented as:
    compare and swap (memory, expected value --> new value)
```

The useful feature of this instruction is its atomicity, such that no operation may intervene in the operation to alter the value of the memory between the conditional check and the setting of the value. Because the atomicity may be more easily achieved at the hardware (processor) level than with a software configuration, the atomic compare-and-swap instruction is often provided as an instruction of the computing architecture. The compare-and-swap operation may be used to implement a semaphore, such that no process may overwrite a particular value in memory that is not currently set to an expected value. This operation may therefore be used to prevent write-after-read (WAR) synchronization errors, where a thread reads a value from memory and writes a new value in its place as a result, while unintentionally overwriting a value that may have been placed in the memory after the read but before the wrote. For instance, the operations:

read expected value from memory;
compare and swap (memory, expected value→new value);

may or may not be executed with other intervening instructions that modify the memory between these instructions. If no such modifications occur, the predicate of the compare-and-swap operation succeeds and the memory is updated; but if such a modification does occur, the predicate of the compare-and-swap operation fails and the memory is not overwritten. This atomicity avoids the overwriting of a value in the memory not anticipated by the processing thread, and the logical errors that may ensue. The atomic operation is therefore "thread-safe," such that a significant source of logical errors due to an untimely modification of a memory shared with another thread is reduced or eliminated.

Figure 7:
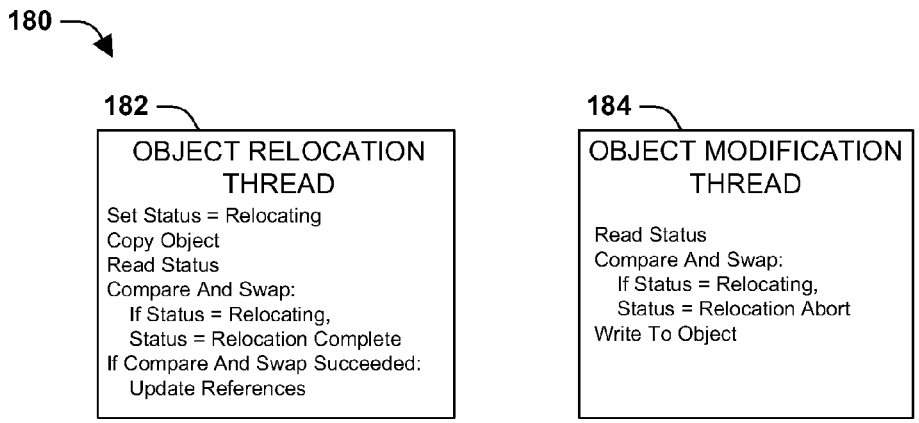
FIG. 7 is an illustration of an object relocation thread and an object modification thread configured to interact through a relocation status indicator with a synchronization mechanism.

A semaphore may be used with the techniques discussed herein to implement a more significantly thread-safe relocation status indicator. FIG. 7 illustrates a portion of an exemplary system 180 for relocating an object that utilizes a compare-and-swap operation as part of the object relocation thread 182 and the object modification thread 184 in accessing and updating the relocation status indicator. As one example, the object relocation thread 182 is configured to verify that the relocation status indicator for the object is still set to a relocating indication before updating the status to a relocation complete indication. Because this comparison and update is performed atomically using a compare-and-swap operation, the object relocation thread 182 avoids an untimely overwriting of a relocation abort indication, as illustrated in the exemplary scenario 170 of FIG. 6. Moreover, the success or failure of the compare-and-swap operation may be checked to determine whether the object relocation has succeeded and the references should be updated by the object relocation thread 182, or whether the object relocation has failed and the references should not be updated by the object relocation thread 182. As another example, the object modification thread 184 may similarly utilize the compare-and-swap operation to verify that an object is still being relocated before the relocation status indicator is updated to a relocation abort indication. This verification may prevent an unintended overwriting of a relocation complete indication written by the object relocation thread 182 that completes the relocation of the object just prior to the updating of the object by the object modification thread 184. Other uses of compare-and-swap operations and semaphores may be devised by those of ordinary skill in the art while implementing the techniques discussed herein.

In this manner, an object relocation thread may be configured to communicate with threads having references to an object targeted for relocation, such as through a relocation status indicator. However, it may be inefficient to configure the threads to check the relocation status indicator of an object prior to each modification of the object. This may be particularly inefficient where one or more threads often modify an object, or where a thread modifies a large number of objects, and may be particularly unproductive if the objects are not often relocated. The implementation of the relocation status indicator as a semaphore, such as described above, may exacerbate the inefficiency due to the added overhead of thread synchronization tasks.

Instead of configuring the threads to check the relocation status indicator of an object prior to each modification, the computer system may configure the threads to perform the relocation status indicator check only for objects that are targeted for relocation. For example, the object relocation thread may be configured to request a relocation acknowledgment for the object from the threads, and may begin the copying only after receiving a relocation acknowledgment for the object from the threads. The threads may be concomitantly configured to receive such requests for relocation acknowledgments for an object, to provide a relocation acknowledgment for the object, and to implement the relocation status indicator checking only before writing to objects that have been targeted for relocation, i.e., for which the thread has received a request for a relocation acknowledgment. This checking may continue until, e.g., the thread detects or is notified that the object has been successfully relocated. For other objects, the thread may freely write to the object, because the relocation of the object (for which the thread may check the relocation status indicator, and update it with a relocating abort indication if the thread modifies the object during the relocation) does not occur until after the thread has received the relocation request.

In opting to provide the relocation acknowledgment, the threads may be configured to determine whether or not the code that the thread is executing comprises a safe point for the specified object. If the thread does not contain a reference to the object, then the thread may simply provide the relocation acknowledgment, as the entirety of the code comprising the thread comprises a safe point for the object. If the thread does contain at least one reference to the object, then the thread may further determine whether the instruction pointer for the thread is in the middle of a code section comprising a compound operation on the object that may be complicated by a relocation, e.g., a combined read, check, and modification of a field of the object, then the thread may delay providing the relocation acknowledgment until the compound operation is complete. However, if the thread is not currently utilizing the object in such a manner, then the thread may determine that the code executed by the thread comprises a safe point for the object, and may promptly provide the relocation acknowledgment. In this manner, an object modifying thread may cooperate with the object relocation thread in determining when to relocate the object, and may perform the checking of the relocation status indicator only of objects that the thread has acknowledged are to be relocated. In various embodiments, the checking may be performed to exchange object relocation acknowledgments for each object to be relocated, or may be performed to exchange one object relocation acknowledgment for a set of objects (e.g., one relocation acknowledgment may be requested and provided with respect to a set of objects to be relocated together, such as the objects relocated during a memory compaction or garbage collection cycle.)

Figure 8:
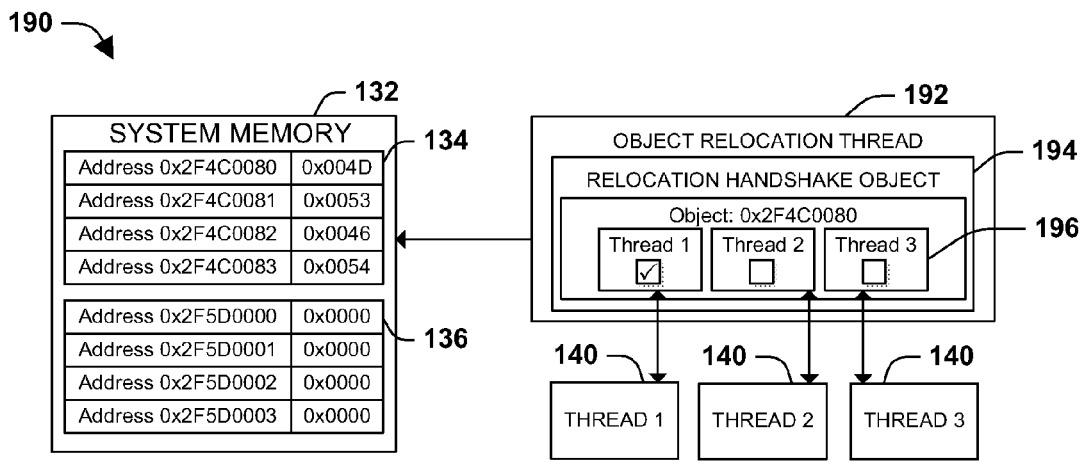
FIG. 8 is a component block diagram illustrating a portion of an exemplary system for relocating an object and configured to communicate with object modification threads through a relocation handshake object.

FIG. 8 presents an exemplary embodiment 190 of these techniques that includes the requesting and providing of relocation acknowledgments by the threads. The exemplary embodiment 190 illustrates an object stored in system memory 132 that is targeted for relocation from a source address 134 to a target address 136 by an object relocation thread 192 that may be modified by one or more threads 140. In this exemplary embodiment 190, the object relocation thread 192 is configured to initiate the relocation by initializing a relocation handshake object 194, which specifies the object to be relocated (e.g., according to its source address) and comprises a relocation acknowledgment flag 196 for each thread 140. The object relocation thread 192 may also request the threads 140 to set the respective relocation acknowledgment flag 196 in the relocation handshake object 194 upon occupying a relocation safe point for the object. Alternatively, the object relocation thread 192 may simply initialize the relocation handshake object 194, and the threads may be configured to poll the object relocation thread 192 to detect the initialization of a relocation handshake object 194. In either scenario, the threads 140 may respond to the relocation acknowledgment request by determining whether the thread 140 occupies a relocation safe point for the object, and each thread 140 may set its respective relocation acknowledgment flag 196 within the relocation handshake object 194 upon reaching such a safe point. The object relocation thread 192 may therefore await the setting of all flags in the relocation acknowledgment object 194 for an object before proceeding with the relocation. Those of ordinary skill in the art may be able to devise many variations in the requesting and receiving of acknowledgments of an object relocation among the object relocation thread and the object modifying threads while implementing the techniques discussed herein.

Figure 12:
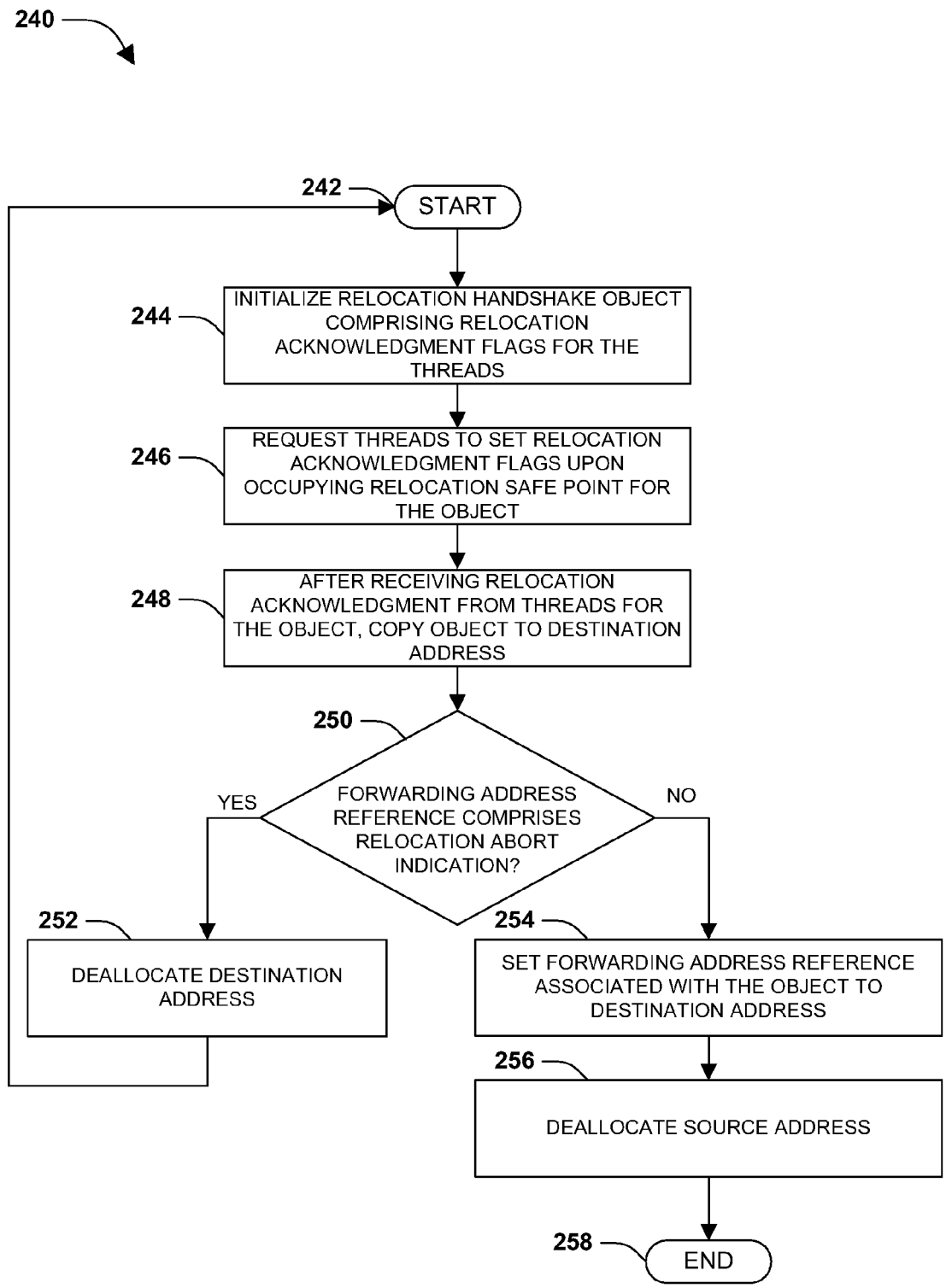
FIG. 12 is a flow diagram illustrating another exemplary method of relocating an object.

A fourth aspect that may vary among implementations relates to the updating of references after the copying. The relocation of the object is not complete until the references to the object stored in the threads are changed from the source address to the destination address. FIGS. 12, 13, and 14 present some techniques for accomplishing the updating of references in accordance with this aspect. Each example illustrates a system memory 202 comprising an object stored at a source address 204 and successfully copied to a destination address 206, which is utilized by various threads 208 having object references 210 associated with the source address 204. The illustrated examples also complete the updating through an object reference updating component 212, which may, e.g., be included in systems for relocating such objects, such as the exemplary system 74 of FIG. 4.

Figure 9:
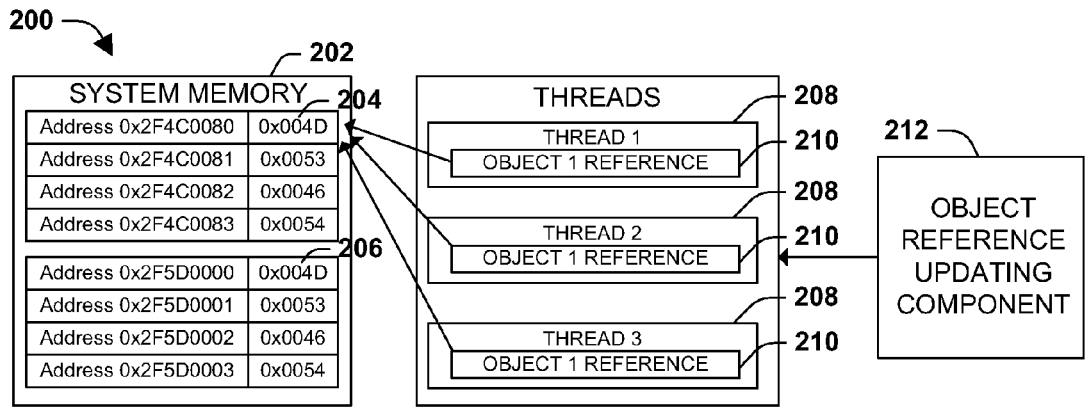
FIG. 9 is an illustration of an exemplary object reference updating operation following a successful object relocation.

FIG. 9 illustrates a first embodiment 200 of an object reference updating component 212, wherein the computer system endeavors to locate all references to a relocated object on an ad hoc basis, e.g., by scanning the stack and heap spaces of all threads to identify words matching the source address that are used as references to the object. Accordingly, the object reference updating component 212 may, through scanning, update the object references 210 within the threads 208 to point to the destination address 206 following a successful copying of the object. However, if many threads exist or memory utilization is large, the scanning may take an inordinately long time.

Figure 10:
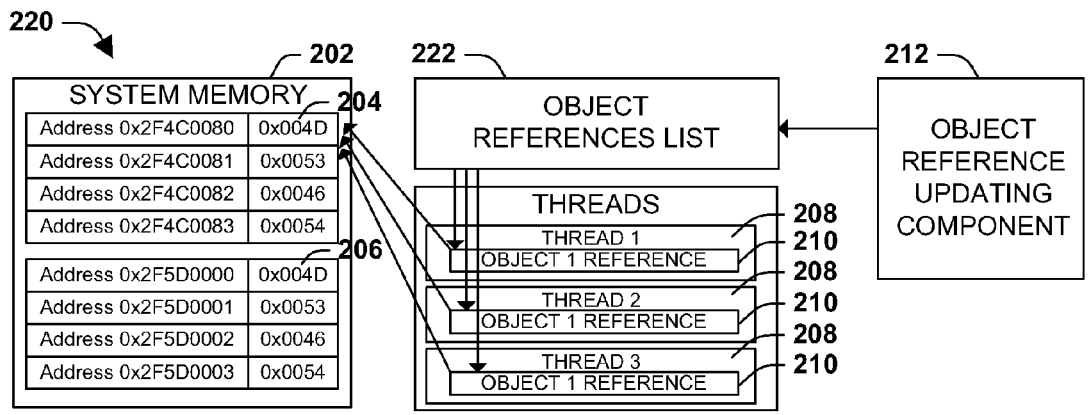
FIG. 10 is an illustration of another exemplary object reference updating operation following a successful object relocation.

FIG. 10 illustrates a second embodiment 220 of an object reference updating component 212, wherein the computer system maintains an object references list 222 that indexes the object references 210 to an object in the system memory. When a thread 208 creates or updates an object reference 210, the computer system (e.g., a runtime configured to service the thread) may automatically insert a reference to the object reference 210 into the object references list 222. As a result, the object references list 222 contains a record of the object references 210 to each object. For instance, the object references list 222 may contain a record referencing the source address 204 for the object, and also the memory addresses of the object references 210 in various threads 208 that currently point to the source address 204. Upon detecting a completed copy of the object targeted for relocation in the absence of any detected object modifications, the object reference updating component 212 may consult the object references list 222 to retrieve an index of the object references 210 to the object that are to be updated to the destination address 206. Although the generation and maintenance of the object references list 222 may consume system resources, the object reference updating component 212 may utilize the object references list 222 to accomplish the updating of the references in a quicker manner than the scanning technique illustrated in FIG. 9. However, the updating of the references is still not instantaneous—particularly if many object references 210 to the object are to be updated—and an object modification during the updating of the object references 210 is still possible.

As an alternative to proactively updating the object references within various threads, the computer system may be devised to configure the threads to maintain the references to various objects with support for relocation. In a third embodiment (not illustrated), an object reference updating component may notify each thread of the relocation of an object, and each thread may endeavor to update the object references within the thread to reference the destination address of the relocated object. One technique for implementing the notification involves generating a thread interrupt for the threads, wherein the interrupt redirects the thread to an object reference updating function configured to update the references to the relocated object within the thread. While this technique may quickly achieve the updating of the references to a relocated object, the generation of such interrupts may impose a system performance penalty due to the abrupt context switches of the various threads to and from the object reference updating function. Moreover, this system performance penalty may be largely unproductive if only a small percentage of the threads contain a reference to the relocated object.

Figure 11:
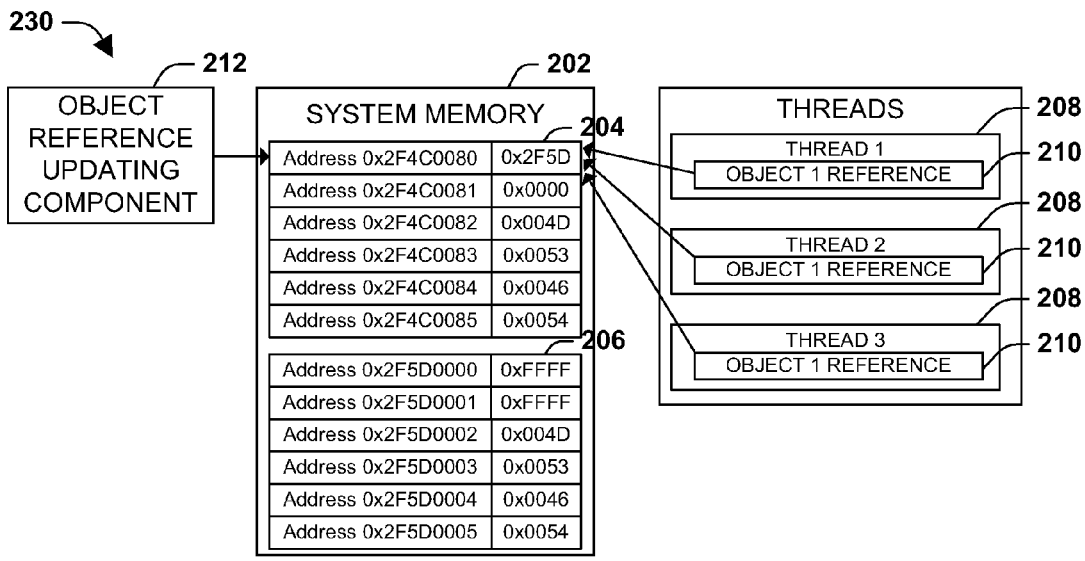
FIG. 11 is an illustration of still another exemplary object reference updating operation following a successful object relocation.

FIG. 11 presents a fourth embodiment 230 of an object reference updating component 202, wherein the computer system is configured to support the relocation of objects in the system memory 212 by storing with various objects a relocation address reference. As illustrated in FIG. 11, an object stored in the system memory 202 is prefaced by an object header referencing a memory address, which may be set to an address to which the object has been relocated. If the object has not been relocated, the relocation address reference may be set to a magic number (e.g., 0xFFFFFFFF or 0x00000000), or may be set to the current address of the object; for instance, the version of the object at the destination address 206 in FIG. 11 may have its relocation address reference set to 0x2F5D0000. (In this example, as in other examples, the words of the system memory 212 in this pedagogical computer system comprise 16-bit values in a 32-bit memory addressing system; therefore, the first two words of each object are used to store the relocation address reference in big-Endian format.) In this exemplary embodiment, the threads 208 contain object references 210 that point to the object header at the top of the source address. Upon interacting with the object, the threads 208 examine the object header to determine if the object has been relocated; if so, the threads 208 update the object references 210 contained therein to the destination address 206 stored in the header. This configuration may present an advantage of making the object forwarding information visible to all threads that have object references 210 with one memory update by the object reference updating component 212; while no object references 210 are changed at the instant of the forwarding address write, the configuration of the threads 208 promotes the use of the object representation at the destination address. In one embodiment, this is performed by redirecting the object references 210 before the next memory access by the thread 208 to the object. This embodiment may provide an advantage of conserving system performance by avoiding a high-priority mass update of all object references 210. The embodiment may also provide the advantage of having a single decision point for choosing between a successful object relocation and a failed object relocation, which reduces or eliminates the probability of a scenario of a modification of the object at the source address 204 while the object reference updating component 212 is updating the references.

In another embodiment, the forwarding address reference may also serve as the object relocation semaphore to indicate whether or not the object has been relocated. For instance, the forwarding address reference can be set to one of four indications: the address of the object when representing an inactive indication, a first non-address value when representing a relocating indication, a second non-address value when representing a relocation abort indication, and the destination address when representing a relocation complete indication. As one example of this embodiment, the forwarding address reference may be set to a relocating indication (e.g., 0x00000000) if the object is being relocated, and the threads may be configured to set the forwarding address reference to a relocating abort indication (e.g., 0xFFFFFFFF) upon modifying the object. Upon completing the copying of the object to the destination address, the relocation thread may check the forwarding address reference of the object to determine if it still comprises the relocating indication, or if it now comprises a relocating abort indication. If the forwarding address reference has not been changed, the relocating thread may set the forwarding address reference to the destination address to indicate the successful relocation of the object. Moreover, the checking and setting may be performed atomically through an atomic compare-and-swap operation (e.g., test whether the forwarding address reference is still 0x00000000, and if so, set it to the destination address), which may reduce some of the problems discussed herein relating to the synchronized communication of the various threads relating to the relocation of the object. The atomic nature of the compare-and-swap operation also enables this communication to occur without involving a locking mechanism, and may thereby economize computing resources and promote the performance of the computing environment. Those of ordinary skill in the art may be able to devise many variations of these and other aspects of the updating of object references while implementing the techniques discussed herein.

An additional variation of the fourth embodiment 230 of this aspect involves the manner of configuring the threads to update references based on the checking of the forwarding address reference of the object. As one variation, the threads may be configured to check the forwarding address reference upon each usage of the object, e.g., upon following a reference to the object. However, because many objects may be frequently utilized by a thread, the thread may spend a nontrivial amount of time checking forwarding address references, which may be unproductive if such objects are rarely relocated. Thus, it may be inefficient to configure the threads to check the forwarding address reference each time an object is used ((just as it may be inefficient to configure the threads to check the relocation status indicator of an object each time the object is modified.)

As an alternative variation of the fourth embodiment 230 of this aspect, it may be acceptable for a thread to delay the checking of the forwarding address reference for an object, and may continue using an obsolete version of the object at the source address even if the object is relocated to a destination address. For instance, the thread may perform various read operations on the object that may not significantly depend on the most recent version of the object. In this delayed checking variation, the thread may be prompted to update its references upon various events. For instance, the computer system may occasionally prompt the threads to update the references contained therein, e.g., so that a garbage collection cycle may run and reclaim the unused versions of the object. The thread may also be configured to delay the updating until it is about to perform an operation that should utilize a more recent version of the object, such as a relocated version, if one exists. For instance, the thread may be about to write to an object, and may endeavor to update its reference to the object just prior to writing, so that the write is directed to the most current version of the object and the written data will be preserved. Moreover, upon opting to update its reference to an object (e.g., prior to writing), the thread may be configured to update all references to objects managed by the thread; this may be advantageous in promoting the updating of references even to objects that are rarely or never used in ways that prompt the thread to update its references to the object (e.g., read-only objects.) Accordingly, respective threads may be configured to update the object references within the thread before writing to an object referenced within the thread. While delaying the updating of references may cause the computer system to forestall the reclamation of the memory used by the obsolete version of the object at the source address, and may therefore prolong operations that involve such reclamation (e.g., memory compaction), the computer system may exhibit improved system performance by significantly reducing the frequency of checking the forwarding addresses. Many variations in the configuration of threads in checking the forwarding address references of objects may be devised by those of ordinary skill in the art in accordance with the techniques discussed herein.

A fifth aspect that may vary among implementations relates to some actions that may be taken following the performance of the relocation techniques. A first example of variations of this aspect relates to the recycling of memory upon completing the relocation process. If the object is copied and the references are updated in the absence of an object modification, then the relocation may be considered a success. Once the object references within the threads are updated, the version of the object at the source address is no longer in use. The computer system may therefore actively deallocate the source address upon completing the relocation in order to reclaim the object. Alternatively, the computer system might not actively deallocate the source address, but might permit the source address to be deallocated by a garbage collector process, since the object stored therein is no longer referenced by any thread. Similarly, if the relocation fails due to an object modification during the copying, then the process may similarly deallocate the destination address comprising the aborted (and now out-of-sync) copy of the object, or may allow the garbage collector to reclaim the unused memory. In any such scenario, the garbage collector process might deallocate the unused memory blocks upon the next pass, or might wait for a triggering event before reclaiming the memory blocks (e.g., when system memory resources run too low; when system idle time becomes abundant; or when other memory maintenance functions are to be performed on the memory device, such as a main memory compaction or a storage device defragmentation.) A second example of variations of this aspect relates to the response of the computer system to a failed relocation attempt. The computer system might be configured to restart the relocation of the object promptly after a failed relocation, either at the same destination address or at a new destination address. Alternatively, the computer system might be configured to wait a little while before restarting the relocation attempt for the object; this configuration might be predicated upon a prediction that a thread that modifies an object once may modify it again soon, while the object is relevant to the current thread task, but may later be less inclined to modify the object whilst attending to other thread tasks. As a second alternative, the computer system may simply decline a further attempt to relocate the object unless prompted to make a second attempt. Many variations in the subsequent processes of the computer system after completing the relocation attempt may be devised by those of ordinary skill in the art while implementing the techniques discussed herein.

In view of the aspects discussed herein, it may be appreciated that many variations may be implemented in conjunction to produce a method of relocating to a destination address an object located at a source address and referenced by at least one reference within at least one thread. FIG. 12 presents a flow diagram of an exemplary method 240 having many such features. The exemplary method 240 operates within a computing environment wherein the objects are associated with a relocation status semaphore comprising an enumerating semaphore comprising one of an inactive indication, a relocating indication, a relocation abort indication, and a relocation complete indication, and also associated with a forwarding address reference. The exemplary method 240 also operates within a computing environment wherein the threads are configured to provide the relocation acknowledgment in response to a relocation acknowledgment request upon occupying a relocation safe point for the object; to set the forwarding address reference for the object to a relocating abort indication upon modifying the object; and to update references within the thread to the object upon identifying a forwarding address reference associated with the object and before writing to an object referenced within the thread.

Within this computing environment, the exemplary method 240 may attempt an optimistic relocation of the object in the following manner. The method 240 begins at 242 and involves initializing a relocation handshake object comprising relocation acknowledgment flags for respective threads 244. The exemplary method 240 also involves requesting the at least one thread to set the respective relocation acknowledgment flag in the relocation handshake object upon occupying a relocation safe point for the object 246. After receiving a relocation acknowledgment for the object from the at least one thread, the exemplary method 240 involves copying the object to the destination address 248. After copying the object to the destination address 248, the exemplary method 240 examines the forwarding address reference. If the forwarding address reference comprises a relocating abort indication, then the exemplary method 240 branches at 250 and involves deallocating the destination address 252. The exemplary method 240 may (promptly or after a delay) make a second attempt to relocate the object, such as by beginning again at 242; alternatively, the exemplary method 240 may simply report failure, and may end at 258. If the forwarding address reference does not comprise a relocating abort indication, then the exemplary method 240 branches at 250 and involves setting the forwarding address reference associated with the object to the destination address 254 and deallocating the source address 256, at which point the exemplary method 240 ends at 258.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:
1. A method of relocating to a destination address an object located at a source address and referenced by at least one reference, the method comprising:
copying the object to the destination address;
during the copying, monitoring the object to detect an object modification of the object by at least one thread; and
after the copying;
performing a determination of whether the monitoring detected that an object modification by at least one thread occurred during the copying; and updating the at least one reference to the destination address only if the determination indicates that the monitoring did not detect an object modification during the copying.

2. The method of claim 1:
the method comprising: before copying the object, requesting a relocation acknowledgment for the object from the at least one thread; and
the copying occurring after receiving a relocation acknowledgment for the object from the at least one thread.

3. The method of claim 2, the at least one thread configured to provide the relocation acknowledgment in response to a relocation acknowledgment request upon occupying a relocation safe point for the object.

4. The method of claim 3, the requesting comprising:
before the copying, initializing a relocation handshake object comprising relocation acknowledgment flags for respective threads; and
before the copying, requesting the at least one thread to set the respective relocation acknowledgment flag in the relocation handshake object upon occupying a relocation safe point for the object.

5. The method of claim 1, the monitoring comprising:
during the copying, monitoring memory write operations of the at least one thread to detect an object modification.

6. The method of claim 1, the object associated with a relocation status semaphore comprising at least one of a binary semaphore, a counting semaphore, and an enumerating semaphore.

7. The method of claim 6:
the relocation status semaphore comprising an enumerating semaphore at least comprising one of an inactive indication, a relocating indication, a relocation abort indication, and a relocation complete indication;
the monitoring comprising: setting the relocation status semaphore for the object to a relocating abort indication upon detecting an object modification; and
the method comprising:
before copying the object, setting the relocation status semaphore to a relocating indication; and
after copying the object, setting the relocation status semaphore for the object to a relocation complete indication if the relocation status semaphore comprises a relocating indication.

8. The method of claim 7:
the object associated with a forwarding address reference that comprises the relocation status semaphore, and comprising one of:
the address of the object when representing an inactive indication,
a first non-address value when representing a relocating indication,
a second non-address value when representing a relocation abort indication, and
the destination address when representing a relocation complete indication.

9. The method of claim 6:
the relocation status semaphore including an object modification counting semaphore, and
the at least one thread configured to:
increment the object modification counting semaphore before modifying the object, and
decrement the object modification counting semaphore after modifying the object.

10. The method of claim 1, the updating comprising: after copying the object, updating the at least one reference within the active references list of the at least one thread to the destination address if the monitoring did not detect an object modification during the copying.

11. The method of claim 1:
the object associated with a forwarding address reference, and
the updating comprising: after the copying, setting the forwarding address reference associated with the object to the destination address if the monitoring did not detect an object modification during the copying.

12. The method of claim 11, respective threads configured to update references to the object within the thread.

13. The method of claim 12, respective threads configured to update the object references within the thread before writing to an object referenced within the thread.

14. The method of claim 1, comprising:
after the object references within the at least one thread are updated, deallocating the source address.

15. The method of claim 1, comprising:
upon detecting an object modification, deallocating the destination address.

16. A system for relocating to a destination address an object located at a source address and referenced by at least one reference within at least one thread, the system comprising:
a processor, and
memory storing instructions that, when executed on the processor, implement:
an object copier that copies the object to the destination address;
an object modification monitor that detects an object modification of the object by at least one thread during the copying by the object copier; and
an object reference updater that, after the copying:
performs a determination of whether the monitoring detected that an object modification by at least one thread occurred during the copying; and
updates the at least one reference to the destination address only if the determination indicates that the object modification monitor did not detect an object modification during the copying by the object copying component.

17. The system of claim 16, the instructions further implementing:
a handshake component configured to initialize a handshake structure comprising a relocation acknowledgment flag for respective threads, and before the copying, to request the at least one thread to set the relocation acknowledgment flag upon occupying a move safe point for the object.

18. The system of claim 16, the instructions further implementing:
a relocation status semaphore associated with the object and comprising at least one of a binary semaphore, a counting semaphore, and an enumerating semaphore.

19. The system of claim 18:
the object associated with a forwarding address reference that comprises the relocation status semaphore, and comprising one of:
the address of the object when representing an inactive indication,
a first non-address value when representing a relocating indication,
a second non-address value when representing a relocation abort indication, and
the destination address when representing a relocation complete indication.

20. A computer-readable storage device comprising instructions that, when executed on a processor of a device having a memory, manage objects in the memory by:
- upon receiving a request to relocate to a destination address an object located at a source address referenced by at least one reference:
  - copying the object to the destination address;
  - during the copying, monitoring the object to detect an object modification of the object by at least one thread; and
- after the copying:
  - performing a determination of whether the monitoring detected that an object modification by at least one thread occurred during the copying; and
  - updating the at least one reference to the destination address only if the determination indicates that the monitoring did not detect an object modification during the copying.

\* \* \* \* \*